United States Patent [19]

Orthman

[11] Patent Number: 4,519,623
[45] Date of Patent: May 28, 1985

[54] TRACTOR FRONT END HITCH

[75] Inventor: Henry K. Orthman, Lexington, Nebr.

[73] Assignee: Orthman Manufacturing, Inc., Lexington, Nebr.

[21] Appl. No.: 492,896

[22] Filed: May 9, 1983

[51] Int. Cl.³ ............................................. A01B 59/043
[52] U.S. Cl. .............................. 280/461 A; 280/481; 172/439
[58] Field of Search .......... 280/461 A, 460 A, 456 A, 280/490 A, 497, 481; 172/439, 450

[56] References Cited

U.S. PATENT DOCUMENTS

| | | | |
|---|---|---|---|
| 2,749,823 | 6/1956 | Mitchell | 172/439 X |
| 3,145,781 | 8/1964 | Rogler | 172/439 X |
| 3,201,878 | 8/1965 | Markwardt | 280/481 X |
| 3,255,828 | 6/1966 | Abbott | 172/439 X |
| 3,910,355 | 10/1975 | Elfes et al. | 172/450 |
| 4,116,458 | 9/1978 | Berg | 172/450 X |
| 4,181,181 | 1/1980 | Old | 280/481 X |

FOREIGN PATENT DOCUMENTS

| | | | |
|---|---|---|---|
| 2475347 | 8/1981 | France | 172/439 |
| 1500179 | 2/1978 | United Kingdom | 172/439 |

OTHER PUBLICATIONS

2010 Gasoline Wheel Tractor, John Deere Operator's Manual OM-T-15371T, 1961, p. 26.

Primary Examiner—John A. Pekar
Attorney, Agent, or Firm—Zarley, McKee, Thomte, Voorhees & Seas

[57] ABSTRACT

A tractor front end hitch comprising a main frame removably secured to the front end of a tractor and having a pair of lower lift arms pivotally secured thereto and extending forwardly therefrom for connection to the implement. A pair of upper lift arms are pivotally secured at their rearward ends to the main frame and extend forwardly therefrom above the lower lift arms. A length adjustable float arm assembly is pivotally connected at its upper end to the forward end of each of the upper lift arms and is pivotally connected at its lower end to one of the lower lift arms rearwardly of the forward end thereof. Each of the float arm assemblies has a clevis element at the lower end which is provided with an elongated slot to permit the associated lift arm to vertically move or float relative to the upper lift arm associated therewith. A float stop pin is removably insertable into the slot in the clevis element to limit the float. A top link is pivotally secured at its rearward end to the main frame and extends forwardly therefrom for connection to the implement. Each of the lower lift arms has a box frame construction to achieve the desirable compressive strength for the lift arm and for limiting the lateral sway or movement of the lift arm.

25 Claims, 4 Drawing Figures

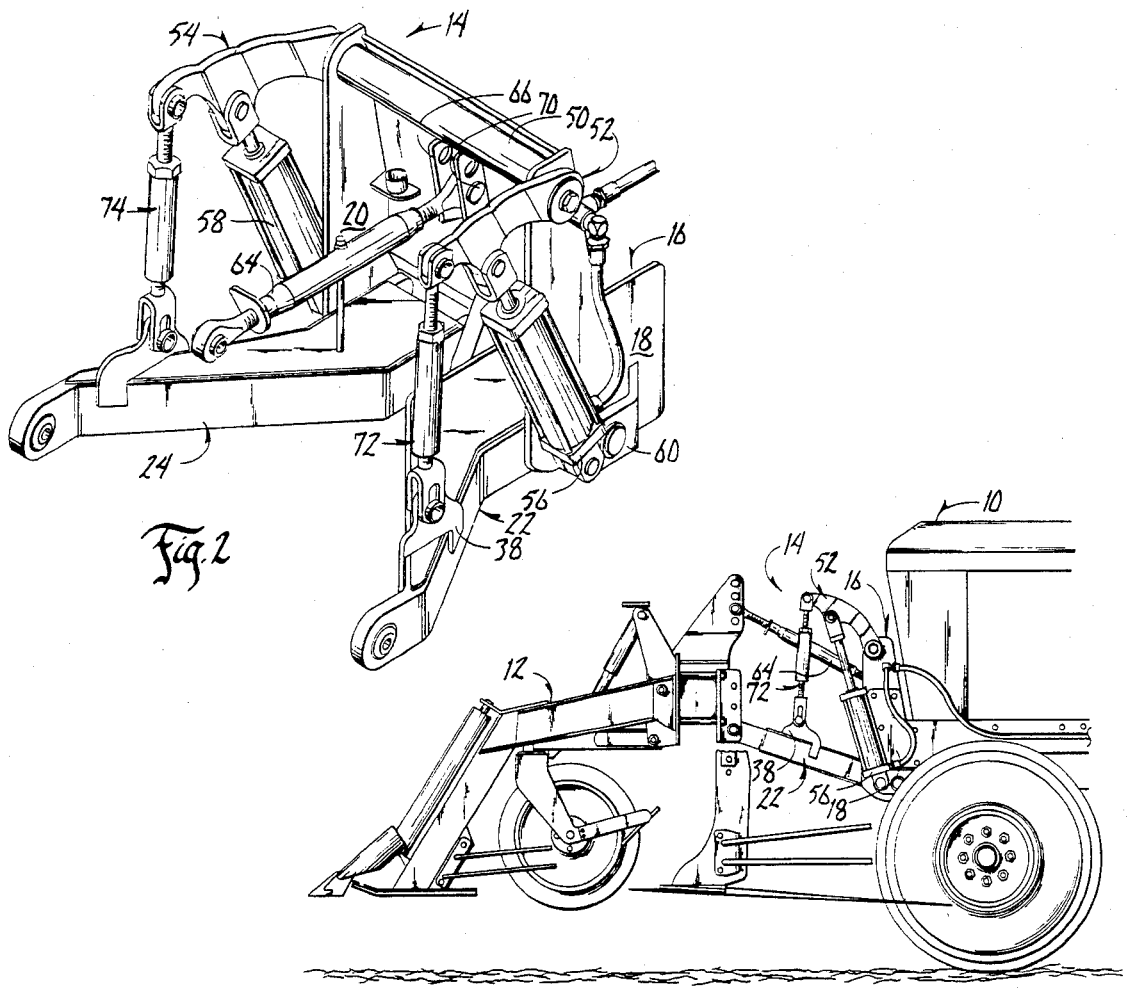
Fig. 2
Fig. 1
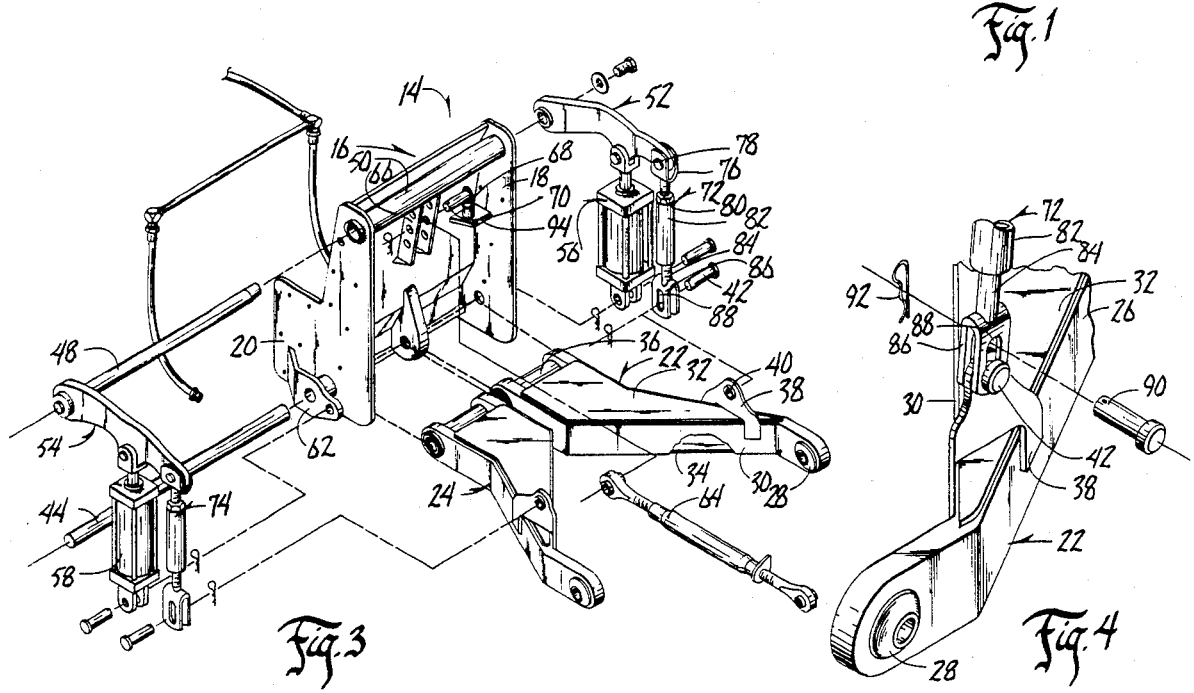
Fig. 3
Fig. 4

TRACTOR FRONT END HITCH

BACKGROUND OF THE INVENTION

For many years, tractors have been employed to pull trailing implements through the field. Conventional three-point hitches as well as single drawbars are typical of the type of hitches utilized at the rearward end of the tractor to provide the necessary connection between the tractor and the trailing implement.

In recent years, it has been found desirable to mount certain types of implements at the forward end of the tractor. Ordinarily, three-point hitches are employed to secure the components to the front or forward ends of the tractors. However, inasmuch as the lower lift arms of the three-point hitches are subjected to extreme compressive forces, the lower lift arms sometimes fail and are subject to breakage. Additionally, the lower lift arms tend to move laterally or sway due to the construction thereof.

A further problem associated with the mounting of implements at the front end of the tractor is that vertical forces are applied to the hitch from the implement as the implement follows the contours of the ground. The vertical forces imposed on the hitch are normally transmitted to the hydraulic cylinders on the hitch and the hydraulic cylinders are subjected to extreme pressures and subsequent wear.

Therefore, it is a principal object of the invention to provide an improved hitch for the front end of a tractor.

A further object of the invention is to provide a three-point hitch for the front end of a tractor including lower lift arms which are of a box frame construction.

A further object of the invention is to provide a three-point hitch for the front end of a tractor which substantially eliminates lateral movement or sway of the hitch or implement.

A further object of the invention is to provide a three-point hitch for the front end of a tractor including a float arm assembly designed to permit the lower lift arms to vertically move or float relative to the upper lift arms.

Still another object of the invention is to provide a three-point hitch assembly for the front end of a tractor including a float arm assembly which permits vertical movement or float of the lower lift arms together with means for limiting the float as desired.

Still another object of the invention is to provide a three-point hitch for the front end of a tractor which is durable in use.

These and other objects will be apparent to those skilled in the art.

BRIEF DESCRIPTION OF THE DRAWINGS

FIG. 1 is a side view of the hitch of this invention on the forward end of a tractor and having an implement mounted thereon;

FIG. 2 is a front perspective view of the hitch of this invention;

FIG. 3 is a front exploded perspective view of the hitch of this invention; and

FIG. 4 is a partial front perspective view of the left lower lift arm and the lower end of the float arm assembly.

SUMMARY OF THE INVENTION

The three-point hitch of this invention comprises a main frame which is secured to the front end of a tractor and which has opposite sides and upper and lower ends. A pair of lower lift arms extend forwardly from the lower end of the main frame and are of box frame construction so as to have the necessary compressive strength. Not only do the lift arms withstand severe compressive forces but the lift arms prevent lateral sway of the implement and the hitch. A pair of upper lift arms are pivotally secured to the upper end of the main frame and extend forwardly therefrom over the lower lift arms. A pair of hydraulic cylinders pivotally connect the upper lift arms and the main frame. A pair of length adjustable float arm assemblies pivotally secure the forward ends of the upper lift arms to the lower lift arms. Elongated slots are formed in the lower end of the clevis element at the lower end of the float arm assemblies to permit the lower lift arms to vertically move or float relative to the upper lift arms. A float stop pin may be inserted into the slots in the clevis element to limit the float as desired.

DESCRIPTION OF THE PREFERRED EMBODIMENT

Referring to the drawings, the numeral 10 designates a conventional tractor while the numeral 12 designates an implement such as an edible bean cutter. The hitch 14 of this invention is illustrated in FIG. 2 and is designed to connect the implement 12 to the front end of the tractor 10.

Hitch 14 comprises a main frame means 16 including a pair of side mounting plates 18 and 20 which are bolted to the front end of the tractor at the opposite sides thereof. The precise construction of the main frame means 16 will depend upon the particular tractor to which the hitch is being mounted. However, for purposes of this description, the main frame means 16 will be described as having upper and lower ends and opposite sides.

A pair of lift arms 22 and 24 are pivotally secured at the rearward ends to the lower end of the main frame means 16 and extend forwardly therefrom. Lower lift arm 22 comprises an outer tug bar 26 which extends forwardly and outwardly from its rearward end and which is provided with a bushing 28 at its forward end which is adapted to be connected to the implement 12 by means of a pin or the like. Lower lift arm 22 also includes an inner tug arm 30 which extends forwardly from the rearward end thereof and thence inwardly for connection to tug arm 26. A top plate 32 is welded to the upper ends of the tug arms 26 and 30. A bottom plate 34 is welded to the lower ends of the tug arms 26 and 30. The design of the tug arms 26 and 30 and the plates 32 and 34 provide a box frame construction which will resist extreme compressive forces and which will prevent lateral sway of the hitch and the implement. Shaft 36 is welded or otherwise secured to the rearward ends of tug arms 26 and 30. Bracket 38 extends upwardly from the lower lift arm 22 and has opening 40 formed therein adapted to receive pin 42 as will be described in more detail hereinafter. Inasmuch as lower lift arm 24 is the mirror image of lower lift arm 22, the lower lift arm 24 will not be described in detail.

The rearward ends of lower lift arms 22 and 24 are pivotally secured to the main frame means 16 by means of the shaft 44. Shaft 44 extends through the lower end of the main frame means as illustrated and through the shafts at the rearward end of the lower lift arms. Shaft 44 is maintained in position by any suitable means such as by pins at the outer ends thereof. Shaft 40 extends through tube 50 at the upper end of main frame means 16 and has upper lift arms 52 and 54 secured to its outer ends thereof as illustrated. Hydraulic cylinders 56 and 58 are pivotally connected at their rod ends to the upper lift arms 52 and 54 respectively and are pivotally connected at their lower ends to the mounting brackets 60 and 62 provided at the opposite sides of the main frame means 16 as seen in the drawings. Top link 64 is length adjustable and is pivotally connected at its rearward end to the mounting plates 66 and 68 by pin 70 and extends forwardly therefrom for pivotal connection with the implement as illustrated in FIG. 1.

Length adjustable float arm assemblies 72 and 74 are pivotally connected at their upper ends to the forward ends of upper lift arms 52 and 54 and are pivotally connected at their lower ends to the lower lift arms 22 and 24 respectively. Float arm assembly 74 includes an upper clevis element 76 which is pivotally secured to the forward end of lift arm 52 by pin 78. Threaded shaft 80 is secured to clevis element 76 and extends downwardly therefrom and is threadably received by the tubular body portion 82. Threaded shaft 84 is threadably mounted in the tubular body portion 82 and extends downwardly therefrom as illustrated in the drawings. The lower end of threaded shaft 84 has clevis element 86 secured thereto. As seen in FIG. 4, the legs of the clevis element 86 are provided with elongated vertically disposed slots 88 formed therein. Clevis element 86 is secured to bracket 38 by means of the pin 42 extending therethrough. It can be seen in FIG. 4 that the length of the slots 88 is sufficient so that the lower lift arm 22 may vertically move or float relative to the clevis element. The purpose of the float slots 88 in the clevis element 86 is to permit the lower lift arm to float without causing movement of the upper lift arm associated therewith and without imparting forces on the hydraulic cylinder as the implement follows the contour of the ground. When it is desired to prevent the float of the lower lift arm, float stop pin 90 is inserted through the float slots 88 and held therein by pin 92. When the float stop pin 90 is not positioned in the float stops 88, it may be stored in the float stop pin storage element 94 provided on frame means 16 as seen in FIG. 3. Inasmuch as float arm assembly 74 is identical to float arm assembly 72, float arm assembly 74 will not be described in detail.

In operation, the hitch 14 is normally left on the tractor and may be easily connected to the implement 12 by connecting the forward ends of the lower lift arms 22 and 24 to the implement and by connecting the forward end of the top link 64 to the implement. Actuation of the hydraulic cylinders causes the implement 12 to be raised and lowered relative to the tractor. As previously stated, the implement 12 will follow the contour of the ground and the lower lift arms 22 and 24 may vertically move or float relative to the upper lift arms and the hydraulic cylinders. The box frame construction of the lower lift arms 22 and 24 provides the necessary strength for the lower lift arms even though the lower lift arms are subjected to large compressive forces. Thus, the construction of the lower lift arms 22 and 24 permits the hitch to be mounted on large horsepower tractors without fear that the lower lift arms will fail. The box frame construction of the lower lift arms and the means for pivotally mounting the same to the frame means prevent the lower lift arms from laterally moving or swaying as the implement is being pushed through the field.

Thus it can be seen that the hitch of this invention accomplishes at least all of its stated objectives.

I claim:

1. A front end hitch for a tractor, comprising, a main frame means removably secured to the front end of the tractor having upper and lower ends and opposite sides, a pair of lower lift arms having rearward and forward ends, said lower lift arms being pivotally secured at their rearward ends to said main frame means at the lower end thereof and extending forwardly therefrom, a pair of upper lift arms having rearward and forward ends, said upper lift arms being pivotally secured at their rearward ends to said main frame means and extending forwardly therefrom above said lower lift arms, a first hydraulic cylinder means pivotally connected at one end to said main frame means at one side thereof and pivotally connected at its other end to one of said upper lift arms, a second hydraulic cylinder means pivotally connected at one end to said main frame means at the other side thereof and pivotally connected at its other end to the other of said upper lift arms, a first elongated member having upper and lower ends pivotally connected at its upper end to the forward end of said one upper lift arm and pivotally connected at its lower end to one of said lower lift arms, a second elongated member having upper and lower ends pivotally connected at its upper end to the forward end of the other upper lift arm and pivotally connected at its lower end to the other lower lift arm, said lower lift arms comprising an outer tug arm extending forwardly and outwardly from said main frame means, an inner tug arm extending forwardly and outwardly from said main frame means, the rearward ends of said inner and outer tug arms being spaced-apart, the forward end of said inner and outer tug arms being secured together rearwardly of the forward end of said lower lift arm, said tug arms having upper and lower sides, and spaced-apart top and bottom plates secured to and extending between said inner and outer tug arms at the upper and lower sides thereof respectively, and the forward ends of said lower lift arms being adapted for connection to the implement whereby actuation of said hydraulic cylinder means will cause the implement to be vertically moved with respect to the tractor.

2. The hitch of claim 1 wherein each of said lower lift arms has a tube means secured to and extending between the rearward ends of said inner and outer tug arms, and a shaft means extending through the tube means on each of said lower lift arms for pivotally connecting said lower lift arms to said main frame means.

3. The hitch of claim 2 wherein said main frame means has a forwardly extending bracket positioned between the inner tug arms of said lower lift arms, said shaft means extending through said bracket and the sides of said main frame means.

4. The hitch of claim 2 wherein each of said elongated members comprises a float arm assembly to permit a predetermined amount of vertical movement or float of the forward ends of said lower lift arms without causing pivotal movement of said upper lift arms.

5. The hitch of claim 4 wherein each of said float arm assemblies comprises an upper clevis element pivotally secured to the forward end of the associated upper lift arm, a body portion secured to and extending downwardly from said upper clevis element, a lower clevis element secured to the lower end of said body portion, said lower clevis element comprising spaced-apart legs having vertically disposed elongated float slots formed therein, and a connector pin pivotally extending through said float slots and through the associated lower lift arm, said connector pin being vertically movably received by said float slots to permit the said predetermined amount of vertical movement of said lower lift arm.

6. The hitch of claim 5 wherein a float stop pin is removably insertable in said float slots for limiting the said predetermined amount of vertical movement or float of said lower lift arm.

7. The hitch of claim 5 wherein said float arm assemblies are length adjustable.

8. The hitch of claim 1 wherein each of said elongated members comprises a float arm assembly to permit a predetermined amount of vertical movement or float of the forward ends of said lower lift arms without causing pivotal movement of said upper lift arms.

9. The hitch of claim 8 wherein each of said float arm assemblies comprises an upper clevis element pivotally secured to the forward end of the associated upper lift arm, a body portion secured to and extending downwardly from said upper clevis element, a lower clevis element secured to the lower end of said body portion, said lower clelvis element comprising spaced-apart legs having vertically disposed elongated float slots formed therein, and a connector pin pivotally extending through said float slots and through the associated lower lift arm, said connector pin being vertically movably received by said float slots to permit the said predetermined amount of vertical movement of said lower lift arm.

10. The hitch of claim 9 wherein a float stop pin is removably insertable in said float slots for limiting the said predetermined amount of vertical movement or float of said lower lift arm.

11. The hitch of claim 10 wherein each of said float arm assemblies are length adjustable.

12. The hitch of claim 1 further comprising a top link having rearward and forward ends pivotally secured at its rearward end to said main frame means above the lower end thereof and extending forwardly therefrom for connection to an implement.

13. A front end hitch for a tractor, comprising, a main frame means removably secured to the front end of the tractor having upper and lower ends and opposite sides, a pair of lower lift arms having rearward and forward ends, said lower lift arms being pivotally secured at their rearward ends to said main frame means at the lower end thereof and extending forwardly therefrom, a pair of upper lift arms having rearward and forward ends, said upper lift arms being pivotally secured at their rearward ends to said main frame means and extending forwardly therefrom above said lower lift arms, a first hydraulic cylinder means pivotally connected at one end to said main frame means at one side thereof and pivotally connected at its other end to one of said upper lift arms, a second hydraulic cylinder means pivotally connected at one end to said main frame means at the other side thereof and pivotally connected at its other end to the other of said upper lift arms, a first elongated member having upper and lower ends pivotally connected at its upper end to the forward end of said one upper lift arm and pivotally connected at its lower end to one of said lower lift arms, a second elongated member having upper and lower ends pivotally connected at its upper end to the forward end of the other upper lift arm and pivotally connected at its lower end to the other lower lift arm, said lower lift arms comprising an outer tug arm extending forwardly from said main frame means, and inner tug arm extending forwardly from said frame means, the rearward ends of said inner and outer tug arms being spaced-apart, the forward ends of said inner and outer tug arms being secured together, and the forward ends of said lower lift arms being adapted for connection to the implement whereby actuation of said hydraulic cylinder means will cause the implement to be vertically moved with respect to the tractor.

14. The hitch of claim 13 wherein each said inner tug arm extends forwardly and outwardly from said main frame means, the forward ends of said inner and outer tug arms being secured together rearwardly of the forward end of said lower lift arm.

15. The hitch of claim 13 wherein each said outer tug arm extends forwardly and outwardly from said main frame means, each said inner tug arm extends forwardly and outwardly from said frame means, the forward ends of said inner and outer tug arms being secured together rearwardly of the forward end of said lower lift arm.

16. The hitch of claim 13 wherein a plate means is secured between said inner and outer tug arms of each said lift arm.

17. The hitch of claim 16 wherein each said inner tug arm extends forwardly and outwardly from said main frame means, the forward ends of said inner and outer tug arms being secured together rearwardly of the forward end of said lower lift arm.

18. The hitch of claim 16 wherein each said outer tug arm extends forwardly and outwardly from said main frame means, each said inner tug arm extends forwardly and outwardly from said frame means, the forward ends of said inner and outer tug arms being secured together rearwardly of the forward end of said lower lift arm.

19. The hitch of claim 13 wherein said tug arms have upper and lower sides and spaced-apart top and bottom plates secured to and extending between said inner and outer tug arms at the upper and lower sides thereof respectively.

20. The hitch of claim 19 wherein each said inner tug arm extends forwardly and outwardly from said main frame means, the forward ends of said inner and outer tug arms being secured together rearwardly of the forward end of said lower lift arm.

21. The hitch of claim 19 wherein each said outer tug arm extends forwardly and outwardly from said main frame means, each said inner tug arm extends forwardly and outwardly from said frame means, the forward ends of said inner and outer tug arms being secured together rearwardly of the forward end of said lower lift arm.

22. A front end hitch for a tractor, comprising, a main frame means removably secured to the front end of the tractor having upper and lower ends and opposite sides, a pair of lower lift arms having rearward and forward ends, said lower lift arms being pivotally secured at their rearward ends to said main frame means at the lower end thereof and extending forwardly therefrom, a pair of upper lift arms having rearward and forward ends, said upper lift arms being pivotally secured at their rearward ends to said main frame means and extending forwardly therefrom above said lower lift arms, a first hydraulic cylinder means pivotally connected at one end to said main frame means at one side thereof and pivotally connected at its other end to one of said upper lift arms, a second hydraulic cylinder means pivotally connected at one end to said main frame means at the other side thereof and pivotally connected at its other end to the other of said upper lift arms, a first elongated member having upper and lower ends pivotally connected at its upper end to the forward end of said one upper lift arm and pivotally connected at its lower end to one of said lower lift arms, a second elongated member having upper and lower ends pivotally connected at its upper end to the forward end of the other upper lift arm and pivotally connected at its lower end to the other lower lift arm, said lower lift arms having rearward and forward ends, said rearward ends being wider than said forward ends and being independently pivotally attached to said main frame means, and the forward ends of said lower lift arms being adapted for connection to the implement whereby actuation of said hydraulic cylinder means will cause the implement to be vertically moved with respect to the tractor.

23. The hitch of claim 22 wherein said rearward ends of said lower lift arms are mounted along a common axis.

24. The hitch of claim 23 wherein said lower lift arms are mounted along a common shaft which is secured to said main frame means.

25. The hitch of claim 22 wherein said forward ends of said lower lift arms are outward of said rearward ends of said lift arms.

* * * * *